US005510997A

United States Patent [19]

Hines et al.

[11] Patent Number: 5,510,997

[45] Date of Patent: Apr. 23, 1996

[54] DYNAMIC FORMS AND ENVELOPES VERIFICATION SYSTEM

[76] Inventors: William L. Hines, 5825 Walnut Ave., Sacramento, Calif. 95841; Motaz Qutub, 11044 Cobblestone Dr., Rancho Cordova, Calif. 95670; Ronald T. Cabeal, 1205 Hampshire Ct., Roseville, Calif. 95661; Robert L. Fehringer, 3395 Rio Vista, Camino, Calif. 95709; Marc J. Fagan, 2786 Brentwood Pla., Davis, Calif. 95616; Steven L. Mulkey, 2687 Hillcrest Dr., Cameron Park, Calif. 95682; Jonathan D. Emigh, 7050 Mt. Aukum Rd., Somerset, Calif. 95684; Charles E. Preston, 9445 Central Ave., Orangevale, Calif. 95662

[21] Appl. No.: 299,192

[22] Filed: Aug. 30, 1994

[51] Int. Cl.$^6$ .................... G06F 17/00

[52] U.S. Cl. .................... 364/478; 270/58; 53/493

[58] Field of Search .................... 364/478; 270/58, 270/1.1; 53/53, 54, 493–495, 498–500

[56] References Cited

U.S. PATENT DOCUMENTS

| | | | |
|---|---|---|---|
| 4,733,359 | 3/1988 | Luperti et al. | 364/478 |
| 4,733,856 | 3/1988 | Gunther, Jr. | 270/58 |
| 4,734,865 | 3/1988 | Scullion et al. | 364/478 |
| 4,800,505 | 1/1989 | Axelrod et al. | 364/478 |
| 5,039,075 | 8/1991 | Mayer | 270/58 |
| 5,067,088 | 11/1991 | Schneiderhan | 364/478 |
| 5,207,412 | 5/1993 | Coons, Jr. et al. | 270/58 |
| 5,220,770 | 6/1993 | Szewczyk et al. | 53/493 |

*Primary Examiner*—Roy N. Envall, Jr.
*Assistant Examiner*—Steven R. Garland
*Attorney, Agent, or Firm*—James M. Ritchey

[57] ABSTRACT

For use with a mailing packet assembling apparatus that creates a mailing packet from items comprised of machine readable indicia encoded forms and machine readable indicia encoded envelopes that are transferred into the assembling apparatus, a verification system for determining that the correct items are transferred for assembly into the mailing packet. The system has a data base with information on the items within the mailing packet, thereby establishing which forms and envelopes are required in the assembled mailing packet, a plurality of dynamically controlled detectors for identifying the indicia on each form and on each envelope, and a computer for verifying that the data base information and the dynamically detected form and envelope indicia correctly correspond or do not correctly correspond to the desired mailing packet and, if correct, direct the mailing packet to be assembled.

13 Claims, 2 Drawing Sheets

DYNAMIC FORMS AND ENVELOPES VERIFICATION SYSTEM

BACKGROUND OF THE INVENTION

1. Field of the Invention

A system for verifying that preselected forms and envelopes are correctly matched into a mailing packet is disclosed. More specifically, a dynamically timed system utilizing indicia inscribed items is related that confirms that forms, inserts, return envelopes, and the like are correctly matched for inclusion into a mailing packet.

2. Description of the Background Art

Numerous existing patents present schemes for placing and handling identifying codes on items to be mailed. However, none of the existing schemes deals with a rapid system for processing dynamically multiple items for inclusion in or rejection from a forming mailing piece.

Specifically, U.S. Pat. No. 4,800,505 presents a mail preparation system having means for maintaining a data base for an item to be mailed that is identified with an addressee specific code, means for marking each of the items to be mailed with the addressee specific code, means for preparing the items to be mailed, and means responsive to each addressee specific code for manipulating said preparing means.

Described in U.S. Pat. No. 4,733,856 is a mechanism for forming personalized envelopes and inserts. A personalized envelope is mated with either a personalized letter or personalized card.

A multi-functional document integrator that employs control indicia on specific sheets is described in U.S. Pat. No. 5,207,412. Regular sheets are printed that contain information regarding the placement of an insert sheet. The regular sheets are located in the document immediately preceding the location of an insert sheet. Scanners are utilized to read the indicia and properly place the insert sheets.

U.S. Pat. No. 5,067,088 employs a number of video cameras within an apparatus for assembling mass mail items. For the assembly process, the video cameras sense alpha-numeric sequence indicators placed on components to be assembled into a mailing item. Via the video camera assisted method a personalized mailing item is generated.

A selective outer envelope inserting system is provided in U.S. Pat. No. 5,220,770. A machine readable code is placed on a control piece to direct the insertion of specified inserts within a given envelope.

U.S. Pat. No. 4,733,359 comprises a document collating and inserting system that has displays for document count verification. Bank checks are scanned by video means and a predetermined number of such checks are inserted into an envelope.

An insertion machine with an audit trail and command protocol is detailed in U.S. Pat. No. 4,734,865. Based on given information, an overseeing processor controls the insertion of various inserts into an envelope.

U.S. Pat. No. 5,039,075 relates an automatic document gathering and personalization system. Coupons that are personalized for a given addressee are assembled into a coupon set, with the same addressee code, by the apparatus.

The prior art references fail to provide a synchronized item identification system in which the velocity at which the coded items travel within the apparatus influences the indicia identification process. Higher velocity transfers for items usually require a different indicia scanning scheme than slower velocity transfers. Without such a "feedback" or interconnected speed to scanning scheme, the efficiency and reliability of the system is limited. The subject invention overcomes this limitation by providing a dynamic scanning process that coordinates the item scanning period with the velocity of the transferred item.

SUMMARY OF THE INVENTION

An object of the present invention is to provide a dynamically controlled forms and envelopes verification scheme that assembles a mailing packet with only correct forms and envelopes.

Another object of the present invention is to create a verification system for allowing only a mailing packet with data base determined forms and envelopes to be assembled.

A further object of the present invention is to disclose a system for correctly assembling mailing packets in which the verification process that establishes if the correct forms and envelopes are going into the mailing packets is a dynamic process in which the form and envelope characteristic indicia scanning time is coordinated with the speed of the entering forms and envelopes.

Disclosed is a forms and envelopes verification system. The system is for use with a mailing packet assembling apparatus that creates a mailing packet from items comprised of machine readable indicia encoded forms and machine readable indicia encoded envelopes that are transferred into the assembling apparatus.

Specifically, the system comprises a data base having information on the items within the mailing packet, thereby establishing which forms and envelopes are required in the assembled mailing packet. Further provided is a set of form and envelope indicia scanning dynamic detectors. Each detector has a scanning period responsive to a transfer velocity for each form or each envelope scanned. Included is computer means for verifying that the data base information and the dynamically detected form and envelope indicia correctly correspond or do not correctly correspond to the forms and envelopes within the mailing packet as established by the data base. Generally, a computer means is present for directing the assembling apparatus to form the mailing packet upon the verification of correctly corresponding indicia. Usually, each of the scanning dynamic detectors comprises a bar code reader that scans either the form or envelope indicia during a transfer velocity determined scan cycle.

Preferably, the verification means and the assembly directing means comprise an operator interactive computer or microprocessor. During operation of the verification system the operator interactive computer or microprocessor responds in a suitable manner. If the detected correspondence is correct, the mailing packet is assembled. If the correspondence can not be determined, an alternate processing route is made available for the item or the item is allowed to be assembled, depending upon operator instructions. Likewise, if the detected correspondence is not correct, an alternate processing route is made available for the item.

Other objects, advantages, and novel features of the present invention will become apparent from the detailed description that follows, when considered in conjunction with the associated drawings.

DESCRIPTION OF THE PREFERRED EMBODIMENT

Figure 1:
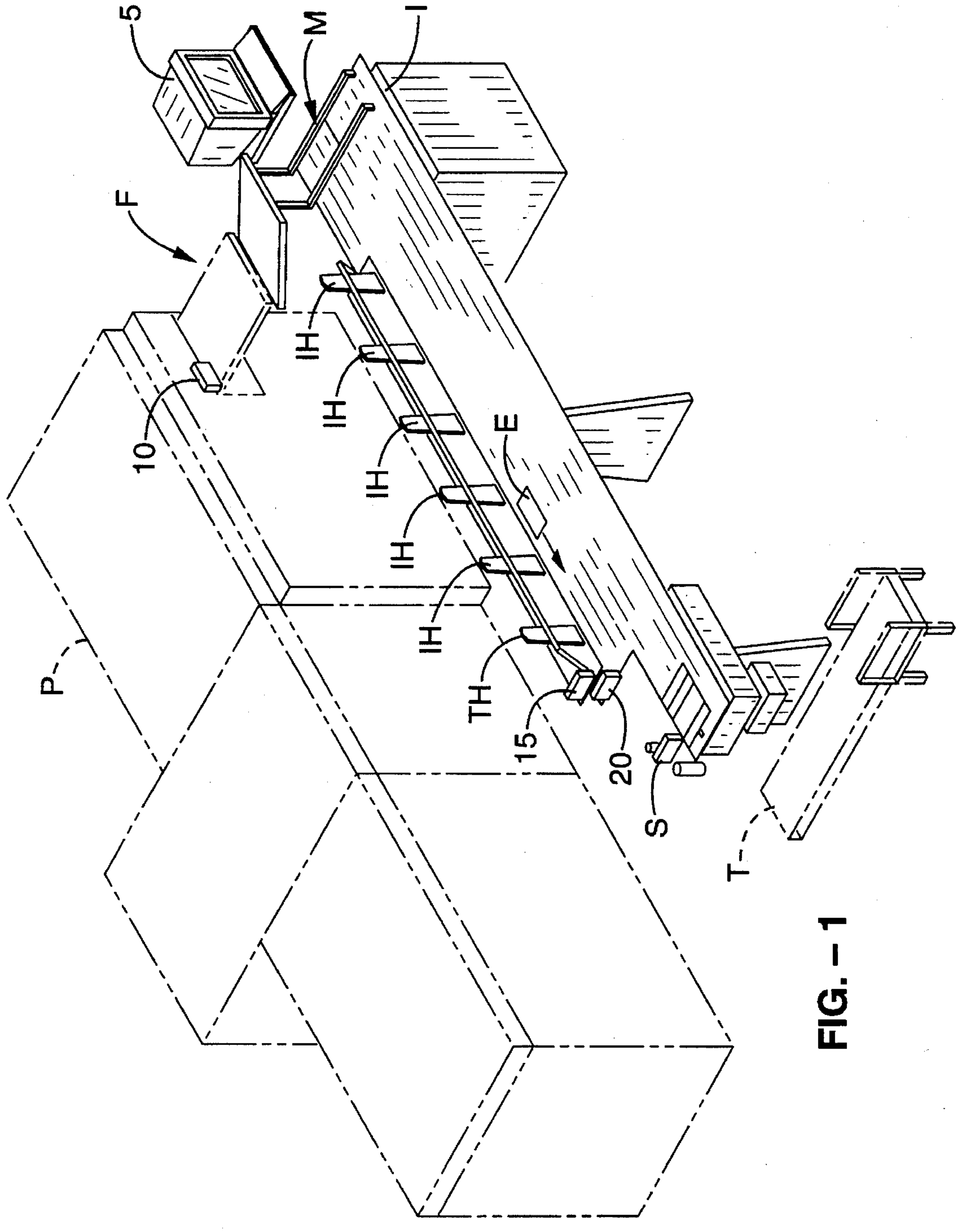
FIG. 1 is a perspective view of a typical mailing packet assembly apparatus employing the subject invention.
Figure 2:
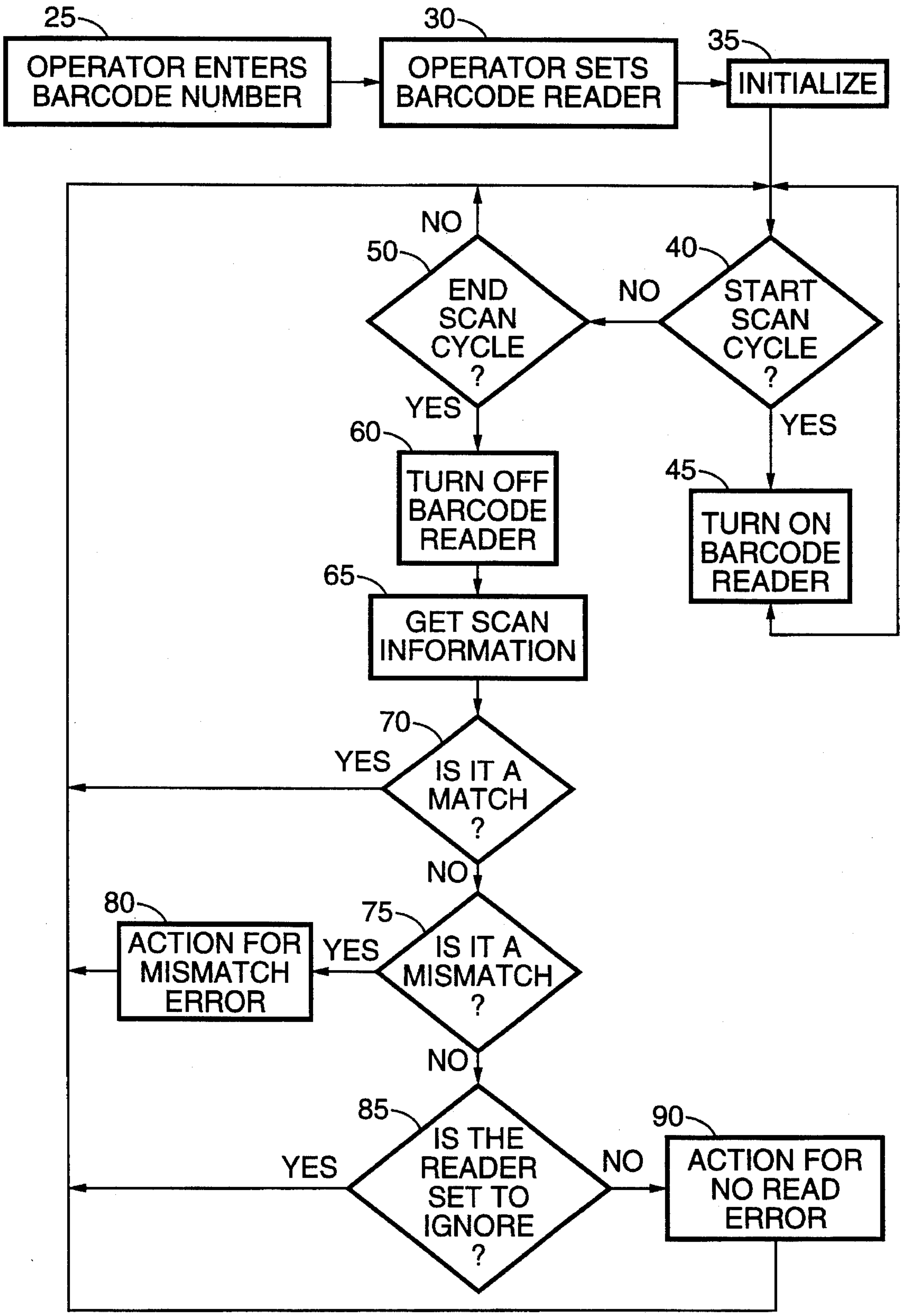
FIG. 2 is a flow diagram of information usually utilized in the subject invention.

Referring now to FIGS. 1 and 2, there is shown a preferred embodiment of a dynamic forms and envelopes verification system used to establish that correct forms and envelopes are assembled into a mailing packet. A type of "feedback" control mechanism is incorporated into mailing packet assembly apparatus in which the speed or velocity of the transferred items is linked to the period of time in which the item identification means functions.

The subject invention is employed in a mailing packet assembly apparatus in which various streams of individual items, comprising various forms and envelopes, are transferred into a final receiving and mailing envelope to create a mailing packet. The forms are often detailed or summary billing statements, check listings, account statements, postcards, advertising fliers, coupons, and similar documents or inserts used by products and services providers and other parties interested in mailing single items or collections of selected items. The envelopes within the mailing envelopes are commonly return envelopes, and the like.

Typically, by way of illustration only and not by way of limitation, the subject invention is utilized by a bulk mailer to insure that forms and envelopes from one client do not get mixed with forms and envelopes from a different client. For example, a bulk mailer handling the billings for two or more cable television companies or telephone companies may have forms and envelopes that at a quick or first glance appear somewhat similar. However, should one company's form be sent in a second company's envelope, or equivalent type situations, embarrassment and possible loss of a client may result. To facilitate eliminating the possibility of such a mix-up and to run the assembly apparatus at the most efficient speed practical, the subject invention was perfected. Not only does the subject invention dramatically increase the probability of a correctly assembled mailing packet, it allows the assembly apparatus to operate at variable item transferring speeds since the verification process is dynamically coupled through "feedback" information between the item transferring speed and the item identification process (characteristic indicia scanning process).

Usually, the assembly apparatus is a standard type of mailer inserter that has been modified to include elements necessary for the subject invention. As seen in FIG. 1, a document or form generating device such as a printer P or the like feeds forms into an inserter I via suitable interfacing hardware such as a folder F and an inserter merger M. Other form generating or supplying devices may be coupled into the incoming flow of items into the inserter I by appropriate means. Various inserts are merged with the form or forms via the inserter I with its associated insert hoppers IH. Usually, the inserts include a return envelope. For illustrative purposes only, FIG. 1 depicts the return envelope transfer means as the terminal hopper TH, but any of the hoppers IH or equivalent means are acceptable. Typically, the mailing envelope E is merged into the flow of items by the inserter I via a mailing envelope pathway (arrow). After assembly by the inserter I the mailing packet is usually sealed by a sealer S and delivered by appropriate means to a transfer means T for further processing.

The standard mailing packet assembly apparatus described immediately above is modified in the subject invention to include a data base accessible by an operator interactive computer or microprocessor. Specifically, a computer 5 is shown in FIG. 1. The data base has information on the exact items that are to be included within each mailing packet. This information may be updated, altered, and the like as necessary. Included in the information within the data base are the types of forms, envelopes (mailing and return), and other inserts required to be within a correctly created and assembled mailing packet.

Each item utilized within the assembly apparatus is marked or encoded with a characteristic machine readable indicia. Usually, the indicia is a bar code (or equivalent means now known or later developed) that identifies the exact type of item. For example, a billing statement for telephone company X with a particular layout, logo, and the like has a characteristic indicia that identifies it as being different from the characteristic indicia on a billing statement for telephone company Z.

Included in the subject invention is means for detecting dynamically the indicia on each indicia encoded form and envelope handled by the assembly apparatus. For clarity, the detection means is described first and then the dynamic element of the detection means is presented. The detection means comprises scanning detectors that are usually bar code readers that scan the indicia encoded items as they pass a particular location in the mailing packet assembly process. Although other equivalent bar code readers are considered as acceptable, a typical brand is a Computer Identics Scan Star operating at about 500 to about 1000 scans per second. Other equivalent means are contemplated to be within the realm of this disclosure and would function in connection with appropriate indicia of the marked items.

The dynamic element of the subject invention is critical in appreciating the advantages that the subject invention has over the prior art devices. Usually, within the computer means is a controlling software program that regulates the scanning period (the time the scanner is scanning the item) each of the scanning devices. This control feature could be hardwired into a microprocessor or the equivalent means for appropriate and suitable situations. Typically the scanners scan the bar codes on each item to be verified as appropriate for inclusion into a mailing packet. The scanners only scan during a scan cycle which is a determined amount of time. The amount of time is determined dynamically based on the transfer speed or velocity of the item being scanned. Since a typical scanner scans a bar code between about 500 and 1000 times per second, even with a rapidly traveling item the scanner will scan the bar code multiple times as the item moves past the scanning device.

Specifically, as noted in FIG. 1, a forms scanner 10 is mounted proximate the printer P, a return envelope scanner 15 is mounted on the inserter I at a suitable position to detect the indicia encoded on the return envelope, a mailing envelope scanner 20 is mounted on the inserter I at a suitable position to detect the indicia encoded on the mailing envelope. Additionally, scanners can be located at each position that an indicia encoded insert enters the assembly pathway (not shown), but since many inserts are generic in nature and suitable for a plurality of clients, scanners are not as critical and are optional in these locations.

Since the subject scanning detectors are dynamic, each one has a scanning period responsive to the transfer velocity for a particular indicia encoded item. A scan cycle determines the amount of time the indicia detector scans a particular form or envelope. Higher velocities use a shorter scan period while slower velocities use a longer scan period.

In general, during the scanning cycle of the verification process, several possible action requiring events can occur.

If a scanner is able to scan and read the bar code, the computer means (or microprocessor equivalent) compares the indicia read (usually a number) with the indicia entered (also, usually a number) by the operator into the computer means from the data base. If the two indicia match, a match counter is incremented. If during the time the item passes by the scanning device, the scanner has read the correct indicia a predefined number of times (dynamically determined based on the time of an item under the scanner at a particular transfer velocity), the item is considered to be correct for transfer to the mailing packet and is transferred to the mailing packet.

If the scanning device is unable to read the bar code the required number of times, a defined action takes place. This action could consist of, but is not limited to, diverting the item for inspection by the operator, stopping the system for inspection of the item by the operator, or allowing the item to be processed normally with no inspection action taken.

If the incorrect indicia from the item is read the required number of times the system takes a defined action. This action could consist of, but is not limited to, diverting the item for inspection by the operator or stopping the system for inspection of the item by the operator.

The operator can select two different modes for verification of the items. First, the "standard scan mode" causes an error condition only if a "no-read" or "mis-read" occurs. If this happens, a defined action must take place. Second, the "ignore scan mode" causes an error condition only if a "mis-read" occurs. If a "no-read" occurs the controller (computer microprocessor means) allows it to be processed normally.

For clarity of the subject verification process, a controlling flow diagram is depicted in FIG. 2. The FIG. 2 flow diagram is for exemplary purposes only and is not intended to limit the application settings for the subject invention. Either the computer means 5 directly accesses the data base or an operator enters 25 directly appropriate information concerning a current mailing packet. Usually, the operator enters 25 a barcode number that will appear on the forms, inserts, or envelopes to be verified. Often the information is presented to the operator on a "job card" that contains the appropriate data base information for a certain batch of mailing packets. For a particular assembly "job" appropriate scan periods for each indicia encoded item are set, based on item transfer velocities, for the scanners.

Once an operator enters 25 the appropriate barcode number, the operator has the option 30 to have the system ignore barcodes that are not readable, for whatever reason, or to stop the system if a "no-read" occurs. The reasons for a "no-read" could be poor print quality of the barcode itself, the system cycles too fast to get a legible read, the reader is out of alignment, or the like.

After the "no-read" option 30, the system is initialized 35 to set all of the possible parameters to the properly selected settings. Following initialization 35, is a control element for starting the scan cycle 40. The start scan cycle 40 element is configured to identify a command sent from whatever source to signal starting the scan cycle. If no command to start the scan cycle is sent, the system will continue to loop until it receives a start command. If a start to scan command is received, the barcode scanner (even though a single barcode scanner is used in this example, usually, more than one barcode scanner is involved) is turned on 45.

Control element 50 involves detecting a command sent from whatever source to end the scan cycle. If no command is received, the system will continue to loop until it receives an end command. If an end scan cycle command is received, the barcode scanner is turned off 60.

Next, the barcode reader information is received 65 and processed 70 to determine if a match of the scanned number to a predetermined number exists. If a correct match exists between the scanned item barcode and the expected barcode number, the form, insert, or envelope is processed normally. If something other than a correct match occurs, a subsequent processing step 75 is initiated. If a scan is a mismatch, a predetermined action is taken so the operator can correct the problem. Often the predetermined action is the system stopping or preferably the item is diverted. If the data is not a mismatch, it is a "no-read" and the item moves to step 85. Note, a mismatch is a number that is readable by the barcode scanner and is different than the predetermined and expected number.

After the mismatch step 85, a question is asked to determine if the scan reader is set to ignore the "no-read." If an ignore setting is selected at step 85, the item is processed normally. If an ignore setting is not selected at step 85, step 90 is initiated. In step 90 if the "no-read" option at step 30 is not set to ignore a "no-read," a predetermined action (the system is stopped, the item is diverted, and the like) will be taken to allow the operator to check the item and correct the problem.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. For use with a mailing packet assembling apparatus that creates a mailing packet from items comprised of machine readable indicia encoded forms and machine readable indicia encoded envelopes that are transferred into the assembling apparatus, a verification system for determining that the correct items are transferred for assembly into the mailing packet, the system comprising:

a) a data base having information on the items within the mailing packet, thereby establishing which forms and envelopes are required in a correctly assembled mailing packet;

b) means for detecting dynamically the indicia on each form and on each envelope; and c) means responsive to said detecting means for verifying that said data base information identifying the items that should be within a correctly assembled mailing packet and said dynamically detected form and envelope indicia correctly correspond or do not correctly correspond to the forms and envelopes that should be within the mailing packet as established by said data base, wherein said verifying means includes at least two operational modes for processing variable error causing conditions.

2. A verification system according to claim 1, wherein said dynamic means for detecting the indicia on each form and on each envelope comprises a set of form and envelope indicia scanning detectors with each detector having a scanning period responsive to a transfer velocity for each form or each envelope scanned.

3. A verification system according to claim 2, wherein each of said scanning detectors comprises a bar code reader that scans either the form or envelope indicia during a transfer velocity determined scan cycle.

4. For use with a mailing packet assembling apparatus that creates a mailing packet from items comprised of machine readable indicia encoded forms and machine readable indicia encoded envelopes that are transferred into the assembling apparatus, a verification system for determining that the correct items are transferred for assembly into the mailing packet, the system comprising:

a) a data base having information on the items within the mailing packet, thereby establishing which forms and envelopes are required in a correctly assembled mailing packet;

b) means for detecting dynamically the indicia on each form and on each envelope;

c) means responsive to said detecting means for verifying that said data base information identifying the items that should be within a correctly assembled mailing packet and said dynamically detected form and envelope indicia correctly correspond or do not correctly correspond to the forms and envelopes that should be within the mailing packet as established by said data base, wherein said verifying means includes:

a first operational mode that causes an error condition only if a no-read or a mis-read occurs; and a second operational mode that causes an error condition only if a mis-read occurs; and d) means for directing the assembling apparatus to form the mailing packet upon said verification of correctly corresponding indicia.

5. A verification system according to claim 4, wherein said means for detecting dynamically the indicia on each form and on each envelope comprises a set of form and envelope indicia scanning detectors with each detector having a scanning period responsive to a transfer velocity for each form or each envelope scanned.

6. A verification system according to claim 5, wherein each of said scanning detectors comprises a bar code reader that scans either the form or envelope indicia during a transfer velocity determined scan cycle.

7. A verification system according to claim 4, wherein said verification means and said assembly directing means comprise an operator interactive computer or microprocessor, wherein said operator interactive computer or microprocessor during operation of the verification system responds as follows:

a) if said detected correspondence is correct, the mailing packet is assembled;

b) if said correspondence can not be determined, a first set of alternate processing routes is made available for the item; and c) if said detected correspondence is not correct, a second set of alternate processing routes is made available for the item.

8. For use with a mailing packet assembling apparatus that creates a mailing packet from items comprised of machine readable indicia encoded forms and machine readable indicia encoded envelopes that are transferred into the assembling apparatus, a verification system for determining that the correct items are transferred for assembly into the mailing packet, the system comprising:

a) a data base having information on the items within the mailing packet, thereby establishing which forms and envelopes are required in a correctly assembled mailing packet;

b) a set of form and envelope indicia scanning dynamic detectors with each detector having a scanning period responsive to a transfer velocity for each form or each envelope scanned;

c) computer means responsive to said detecting means for verifying that said data base information identifying items that should be within a correctly assembled mailing packet and said dynamically detected form and envelope indicia correctly correspond or do not correctly correspond to the forms and envelopes that should be within the mailing packet as established by said data base; and d) computer means for directing the assembling apparatus to form the mailing packet upon said verification of correctly corresponding indicia.

9. A verification system according to claim 8, wherein each of said scanning dynamic detectors comprises a bar code reader that scans either the form or envelope indicia during a transfer velocity determined scan cycle.

10. A verification system according to claim 8, wherein said verification means and said assembly directing means comprise an operator interactive computer or microprocessor, wherein said operator interactive computer or microprocessor during operation of the verification system responds as follows:

a) if said detected correspondence is correct, the mailing packet is assembled;

b) if said correspondence can not be determined, a first set of alternate processing routes is made available for the item; and c) if said detected correspondence is not correct, a second set of alternate processing routes is made available for the item.

11. A method for verifying correct assembly of a mailing packet by a mailing packet assembling apparatus that creates the mailing packet from items comprised of forms and envelopes that are transferred into the assembling apparatus, the steps comprising:

a) creating a data base having information on each indicia encoded form and envelope that are to be assembled into the mailing packet;

b) encoding each form and each envelope with a characteristic machine readable indicia;

c) synchronizing a transfer velocity for each indicia encoded form and envelope that is to be transferred into said assembling apparatus with a scanning period for detecting each said characteristic machine readable indicia;

d) transferring each indicia encoded form and envelope into the assembly apparatus;

e) scanning said indicia for each indicia encoded form and envelope transferred into the assembly apparatus;

f) verifying that each indicia encoded form and envelope scanned correctly matches said data base information for each indicia encoded form and envelope that are to be assembled into the mailing packet; and g) assembling the mailing packet if said verification identifies that a correct mailing packet will be created or alternately processing the mailing packet items if said verification identifies that an incorrect mailing packet will be created.

12. A verification process according to claim 11, wherein said alternate processing comprises:

a) if said verification can not be made between said scanned indicia and said data base information for each indicia encoded form and envelope within the mailing packet, a first set of alternate processing routes is made available for the form or envelope; and b) if said verification is not correct between said scanned indicia and said data base information for each indicia encoded form and envelope within the mailing packet, a second set of alternate processing routes is made available for the form or envelope.

13. A method for verifying correct assembly of a mailing packet by a mailing packet assembling apparatus that creates the mailing packet from items comprised of forms and envelopes that are transferred into the assembling apparatus, the steps comprising:

a) creating a data base having information on each indicia encoded form and envelope that are to be assembled into the mailing packet;

b) encoding each form and each envelope with a machine readable indicia indicating a characteristic identity for each form and envelope encoded that is stored in said data base;

c) harmonizing by a computer or microprocessor means a selectable transfer velocity for each indicia encoded form and envelope with a selectable time period for scanning indicia from each indicia encoded form and envelope for form and envelope identification purposes;

d) transferring each indicia encoded form and envelope into the assembling apparatus at said selectable transfer velocities;

e) scanning each indicia encoded form and envelope for indicia information for a said selectable time period with an indicia sensitive means;

f) comparing data base information with said scanned indicia information from said forms and envelopes;

g) responding to said comparison of data base information with said scanned indicia information from said forms and envelopes as follows:

if said comparison indicates that said scanned indicia matches said data base information for each indicia encoded form and envelope within the mailing packet, the mailing packet is assembled;

if said comparison can not be made between said scanned indicia and said data base information for each indicia encoded form and envelope within the mailing packet, a first set of alternate processing routes is made available for the form or envelope; and if said comparison is not correct between said scanned indicia and said data base information for each indicia encoded form and envelope within the mailing packet, a second set of alternate processing routes is made available for the form or envelope.

* * * * *